Dec. 15, 1953     J. W. HOPSON     2,662,781
SELECTIVE BACKUP CONTROL MEANS FOR
TRACTOR-TRAILER UNDERCARRIAGE
Filed Jan. 30, 1950     4 Sheets-Sheet 3
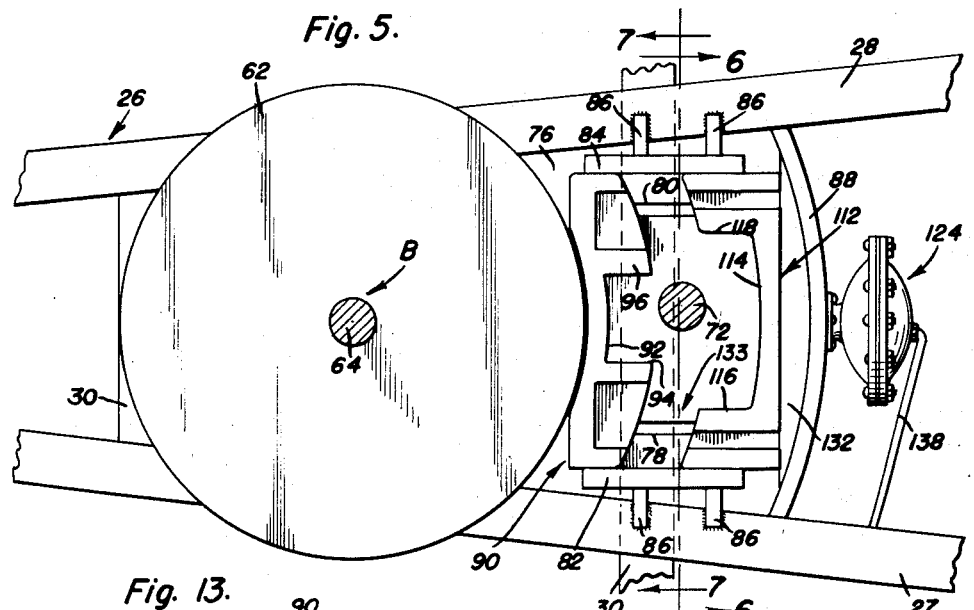
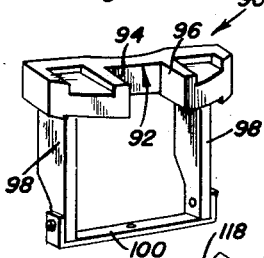
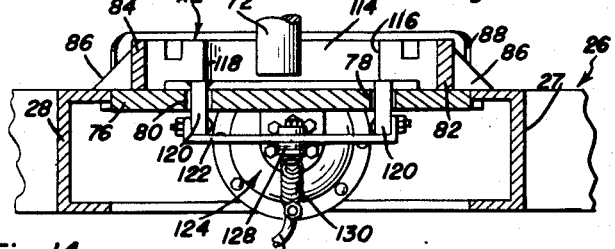
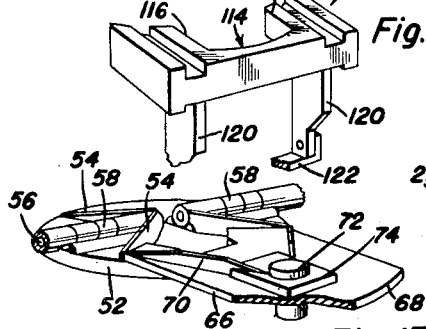
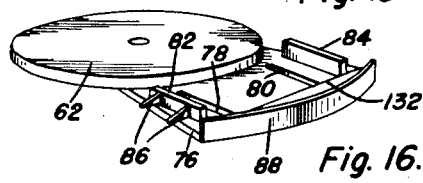
Joseph West Hopson
INVENTOR.

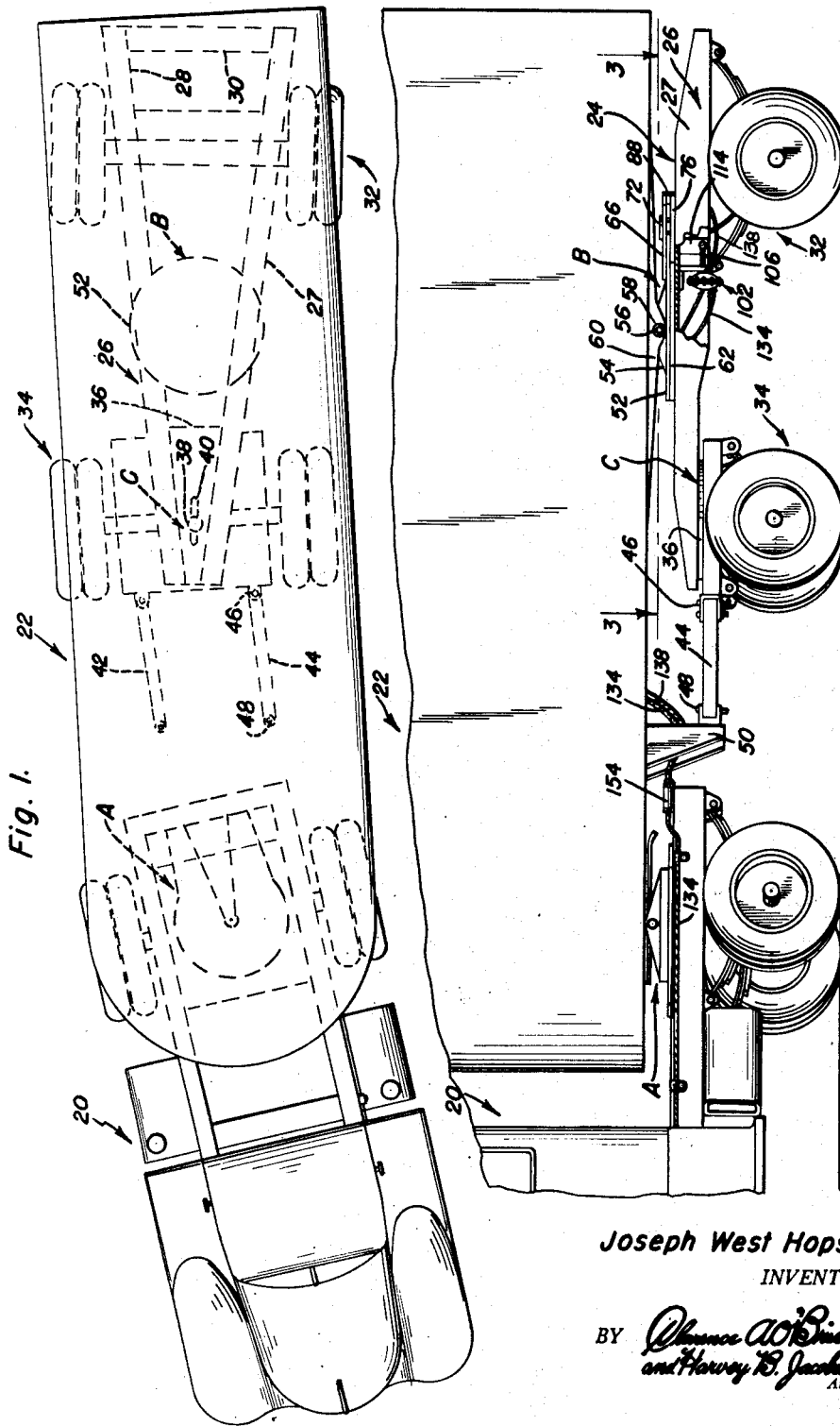

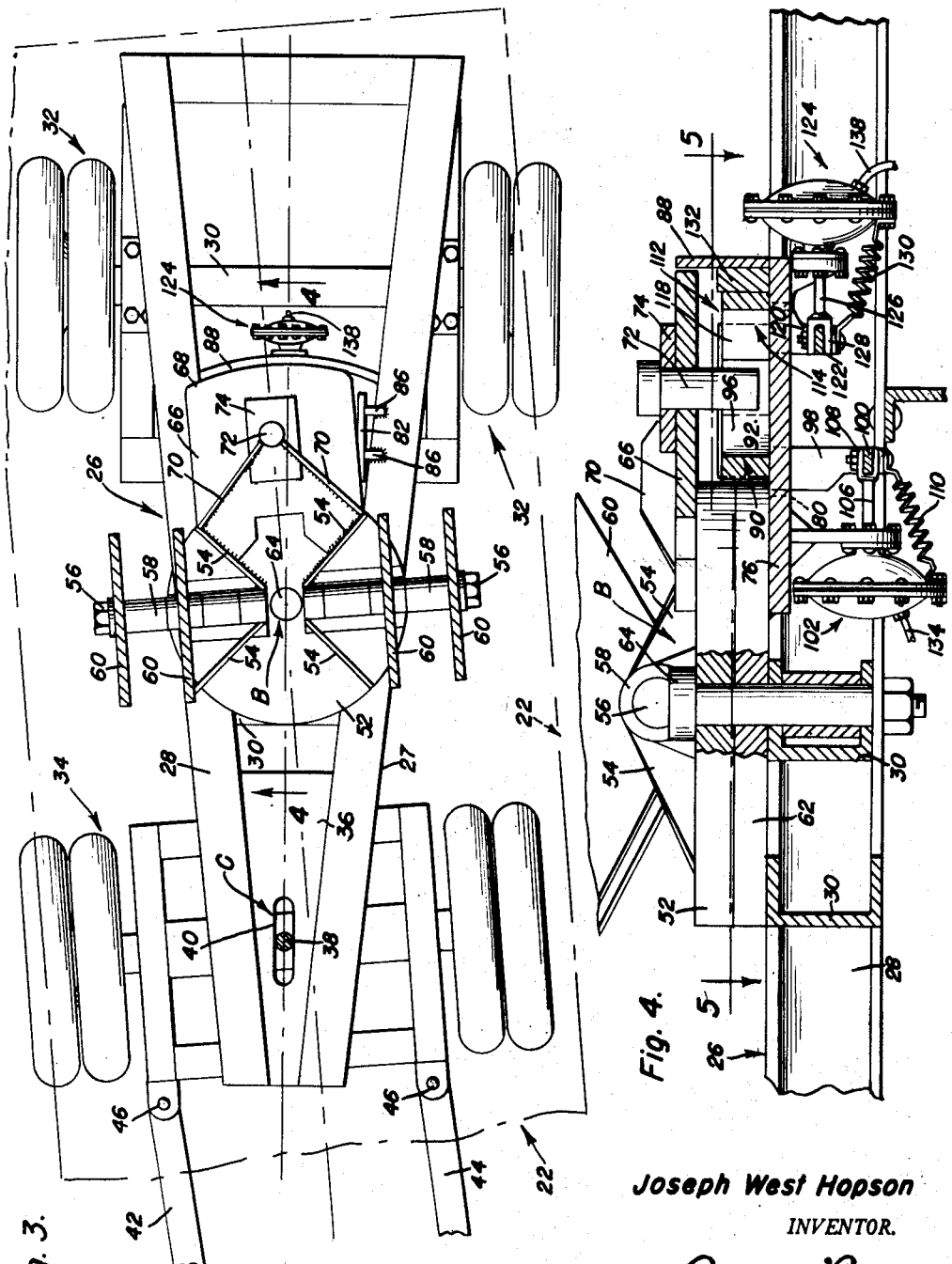

Dec. 15, 1953  J. W. HOPSON  2,662,781
SELECTIVE BACKUP CONTROL MEANS FOR
TRACTOR-TRAILER UNDERCARRIAGE
Filed Jan. 30, 1950  4 Sheets-Sheet 4
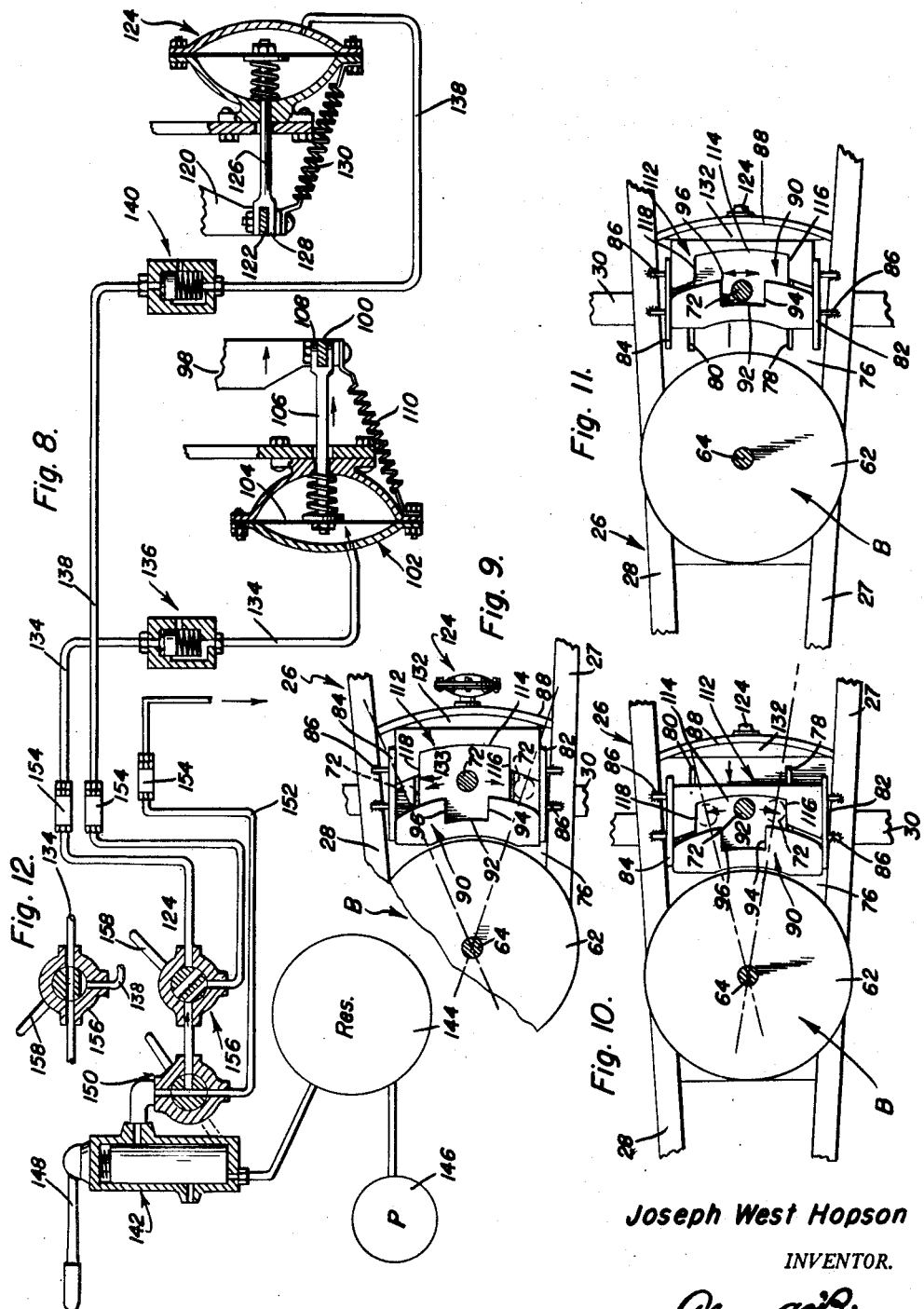
Joseph West Hopson
INVENTOR.

UNITED STATES PATENT OFFICE 2,662,781

SELECTIVE BACKUP CONTROL MEANS FOR TRACTOR-TRAILER UNDERCARRIAGE

Joseph West Hopson, Miami, Fla.

Application January 30, 1950, Serial No. 141,273

7 Claims. (Cl. 280—423)

This invention relates to certain new and useful improvements in a tractor-trailer combination of the type employing a towed and steered mobile undercarriage and has more particular reference to an improved undercarriage for the trailer which is positively and mechanically governed and controllable through the medium of selectively actuatable control means in a manner to assist, correct and safeguard the overall maneuverability of said tractor-trailer both forwardly and rearwardly and yet to not interfere with the undercarriage in its forward motion.

As is clearly implied in the preceding paragraph, it is old in the art to provide a tractor-trailer combination which is characterized by a so-called self-aligning and automatically steerable wheel supported undercarriage and wherein the rear end portion of the load carrying platform of the trailer is supported on the undercarriage by way of an intervening fifth wheel connection, and wherein a dolly is swivelly connected with the forward end of the undercarriage and tongue means is used for operatively connecting the leading steerable end of the dolly to an intermediate portion of said platform. Tractor-trailer combinations wherein the above structural means are disclosed, are revealed, for example, in Patent No. 2,373,398 of April 10, 1945, granted to Ernest S. Hoobler and Patent No. 2,466,194 of April 5, 1949, granted to Wilbur C. Anderson and Edmund W. Riemenschneider.

It is a matter of common knowledge that an undercarriage "out of control" becomes a dangerous and unruly vehicle, making a tractor-trailer equipped therewith a hazardous conveyance during its period of backward motion. Consequently, there has existed for some time the constantly recognized problem of adopting suitable and efficient ways and means to cope with and satisfactorily solve the problem of control. Therefore, an object of the instant invention is to structurally, functionally and otherwise improve on known undercarriages by providing unique adaptations which reliably serve to aptly and adequately meet the requirements of the problem.

The present invention has to do with improvements on both of the aforementioned patents and is, in effect, an addendum to the Anderson et al. patent, the means utilized being directly incorporated in the fifth wheel connection of the undercarriage to the overlying semi-trailer, interposed accessibly in the space between the semi-trailer and undercarriage and being such that the driver of the tractor-trailer can predictably regulate and control and limit the angular displacement between the fifth wheel disks of the undercarriage during the course of rearward motion of the latter.

An object of the invention is to provide satisfactory and reliable back-up control means which will satisfactorily lock the undercarriage to the trailer in reverse direction of travel. Briefly, the means has to do with a vertical stop pin or equivalent device carried by and located beneath the platform of the semi-trailer, said pin being rearwardly of and in longitudinal alignment with the king pin of the adjacent fifth wheel connection between the undercarriage and semi-trailer platform. This pin, in conjunction with controllable shoulder means mounted on the undercarriage, provides satisfactory ways and means of governing and controlling (1) the maximum and (2) minimum angular positions of the undercarriage in respect to the longitudinal center of the semi-trailer.

Novelty is predicated, on the one hand, on a semi-trailer, independently of the tractor or equivalent lead and powering vehicle, which, structurally speaking, has to do with a load-transporting platform, a wheeled undercarriage for said platform including a frame underlying said platform, vertical king pin means providing a fifth wheel connection between the mid-portion of said frame and rear end portion of said platform, a wheeled dolly supporting the forward end of said frame, means slidably and rotatably joining said dolly to said frame, a pair of substantially parallel towing bars pivotally connected at corresponding ends to said dolly and pivotally connected at opposite corresponding ends to said platform to maintain said dolly approximately perpendicular to the longitudinal center line of draft of said platform (as utilized in the Anderson et al. patent), and the combination therewith and addition thereto of stop means and complemental shoulder means located rearwardly of said king pin for sustaining backward motion of said undercarriage and maintaining the minimum angular displacement of latter, whereby to concentrate the backward thrust on said king pin, to equalize forces of compression pushing on said towing bars and to utilize said undercarriage during the reverse direction of travel as a "steering vehicle" capable of guiding and launching the platform into a parking space of restricted area.

Then, too, novelty is thought to reside in an undercarriage per se which is adapted to support the rear end portion of a semi-trailer, which undercarriage is characterized by a frame, a wheeled axle supporting the rear end of said frame, a wheel dolly, slidable and rotatable means operatively connecting the dolly to the forward end portion of said frame, a pair of complemental steering and towing bars respectively located to the right and left of the longitudinal center line of said frame, said bars substantially parallel to each other and being pivoted at their rear ends to said dolly, fifth wheel means including a vertical king pin mounted on the mid-portion of said frame, and readily engageable and releasable lock-up means for the fifth wheel which means is located rearwardly of said king pin for sustaining backward motion of said undercarriage and maintaining the minimum angular displacement of the latter, whereby to concentrate the backward thrust on said king pin, to equalize the forces pushing on said towing bars and to in this manner utilize said undercarriage as a back-up and "steering vehicle" in reliably guiding and directing the platform into any space of restricted area.

More specifically, further novelty is thought to reside in utilizing the upper and lower companion disks of the fifth wheel means of the undercarriage as foundations for upper and lower adapter plates which respectively carry the stop pin and relatively movable abutment members, whereby the stated back-up control means is actually built into and forms a companion part of said fifth wheel means.

Finally, it is an object of the invention to utilize the air brake means in the tractor cab and, through the medium of properly valved lines, to deliver air under pressure from the cab to air cylinders which are properly mounted for purposes of moving slidable shoulder-equipped abutments into and out of cooperable engagement with the control or stop pin.

Other objects and advantages will become more readily apparent from the following description and the accompanying illustrative drawings.

In the accompanying drawings, wherein like numerals are employed to designate like parts throughout the views:

Figure 1 is a top plan view of a tractor-trailer combination with the undercarriage appearing in dotted lines;

Figure 2 is a fragmentary side elevational view showing with greater particularity the construction of the undercarriage and new devices employed thereon, one of the frame members of the undercarriage frame being broken away;

Figure 3 is an enlarged top plan view which may be said to be taken approximately on the horizontal line 3—3 of Figure 2, looking in the direction of the arrows;

Figure 4 is a fragmentary view with parts in section and elevation on a further enlarged scale, the view being taken on the line 4—4 of Figure 3, looking in the direction of the arrows;

Figure 5 is a horizontal section on the plane of the line 5—5 of Figure 4, looking in the direction of the arrows;

Figures 6 and 7 are cross-sections on the lines 6—6 and 7—7 of Figure 5, looking in the direction of the respective arrows;

Figure 8 is a view in section and elevation, diagrammatic in character, showing the ways and means of utilizing the supply of air to operate the control means air cylinders;

Figure 9 is a fragmentary diagrammatic view showing the main or neutral position of the stop pin with both sliding abutments disengaged from said stop pin;

Figure 10 is a view similar to Figure 9 showing the rearward sliding abutment after it has been shifted forwardly where it is then engaged with the stop pin;

Figure 11 is a view showing the forward sliding abutment after it has been shifted rearwardly and is engaged with the stop pin;

Figure 12 is a detail sectional view of the control valve for the air lines to the air cylinders in one of its positions;

Figures 13 and 14 are perspective views of the forward and rearward sliding abutments removed from their mountings;

Figure 15 is a perspective view, with a part in section, showing the upper disk of the fifth wheel means and its fixed adapter plate carrying the stop pin; and Figure 16 is a perspective view of the lower disk with its fixed adapter plate, showing complemental guides and the slotted construction of said plate.

Referring now to the drawings by distinguishing reference numerals and accompanying lead lines, the tractor unit (Fig. 1) is denoted at 20. This is conventional in all respects and need not be described in detail. The semi-trailer unit is denoted at 22 and this may comprise a beam, platform, van or any equivalent construction and is also conventional in construction. The undercarriage unit is generally denoted (Fig. 2) by the numeral 24 and this is characterized by a subframe which is best referred to as an A-frame 26, said frame embodying converging channel irons 27 and 28, with suitable transverse braces 30 (Figs. 3 and 4). The rear end of the subframe is supported on a conventional wheel assembly 32, whereas the forward end is supported on the aforementioned steerable dolly 34. This comprises a wheel assembly and the dolly has a fifth wheel connection (Figs. 1 to 3) at C with the forward end of the subframe. The connection (Fig. 3) is made by way of an appropriate plate 36 and pin 38 and slot 40 connection. This is also usual in undercarriage constructions of the class under consideration. The dolly is linked or harnessed for steering and towing to the underside of the semi-trailer platform. This is accomplished here by way of a pair of spaced parallel complemental towing tongues 42 and 44, respectively. They are hingedly connected at their rear ends to the dolly, as denoted generally at 46 (Fig. 2). Said tongues are hingedly connected at their forward ends, as at 48, to fixed bracket means 50 provided therefor on the semi-trailer. The fifth wheel means, generally denoted, for joining the intermediate portion of the subframe 26 to the underside of the semi-trailer is denoted at B. The semi-trailer 22 is swivelly connected by the usual fifth wheel means at A to the trailing end of the tractor 20, as shown in Figure 2. All of these parts are conventional in form and the subject of invention, as stated, is more or less in the nature of a complement to the fifth wheel means B.

Referring (Figs. 1 to 4) to fifth wheel means B, the numeral 52 designates the usual upper or top disk which, through the medium of flanges 54, pin 56, and bearings 58, is hingedly attached to and suspended from fixed flanges 60 on the underside of the semi-trailer platform. The underlying complemental disk is denoted at 62 and this is welded or otherwise fixed to the intermediate portion of the subframe 26, as shown in Figure 2. The disks are in usual superimposed relationship and swivelly connected by a vertical king pin 64. There is an adapter plate of general rectangular form at 66 which is welded to an edge portion of and projects rearwardly from the disk 52 (see Fig. 15). This plate has a free curvate or arcuate edge 68. It is suitably reinforced with braces at 70 and carries the relatively fixed vertical stop pin 72 reinforced by a cleat or the like 74.

A similar rectangular adapter plate 76 is rigidly attached to and protrudes rearwardly from the disk 62 and underlies the plate 66 in spaced parallelism. It is provided with a pair of spaced parallel guide slots 78 and 80 and also with a pair of upstanding guide flanges 82 and 84 reinforced by suitable webs 86 (see Fig. 16). This plate terminates in an arcuate flange 88 and the curvate edge 68 has wiping contact therewith as shown in Figures 3 and 4. The flange 88 effects a partial enclosure, making up a casing for the selective control means.

The numeral 90 (Fig. 13) designates a forward sliding block which is a selective abutment in use and this has a central keeper notch 92 of predetermined dimensions (approximately five degrees to right or left of zero attitude) defining vertical shoulders 94 and 96, respectively. These shoulders are definite distances apart and will vary according to requirements. This abutment is provided with vertically depending shifting fingers 98—98 connected together by an actuator yoke 100. This yoke and consequently the block or abutment 90 is reciprocated by way of the air cylinder 102 (see Figure 8) whose diaphragm 104 carries a plunger stem 106 which is pivotally connected at 108 with said yoke. The numeral 110 designates a contractile return spring for the abutment 90.

The opposed parallel rearward block or abutment is denoted at 112 (see Fig. 14) and this has a wider keeper notch 114 (approximately 18½ degrees to left or right of zero attitude) opposed to the notch 92 and defining shoulders 116 and 118, respectively, and said block is provided with vertical depending actuating fingers 120—120 connected by a horizontal yoke 122. Both sets of fingers 98—98 and 120—120 operate in the aforementioned guide slots 78 and 80, as is obvious. A second air cylinder 124 is suitably supported from the adapted plate 76 and its plunger 126 is pivotally connected at 128 with the yoke to shift the yoke, and consequently the block or abutment 112, toward and from the stop pin 72. The numeral 130 is a coiled return spring, and 132 denotes a check block, on plate 76, against which the sliding abutment 112 operates (Figs. 9, 10 and 11).

The aforementioned flanges 82 and 84 serve as guides for the respective shiftable abutment blocks 90 and 112 and also as stop shoulders which abut the longitudinally centered relatively thick stop pin 72. It follows that the stop pin provides for three phases of operation shown in Figures 9, 10 and 11. In Figure 9, the abutments 90 and 112 are spaced apart and define, between themselves, an arcuate slot 133 into which the stop pin 72 depends for operation. In Figure 10, the rear abutment block 112 has been shifted into a position for engagement with the stop pin, and therefore the stop pin is situated for limiting operation between the shoulders 116 and 118. In Figure 11, the stop pin is situated for minimum limiting control between the closely spaced shoulders 94 and 96. Thus, these air-controlled abutment blocks coordinate their respective functions, in conjunction with the shoulders 82 and 84 in providing the three-phase operations shown in Figures 9 to 11, inclusive, the position in Figure 9 being the neutral or normal position, and the position in Figure 10 being the position the block 112 occupies for undercarriage regulation in forward motion. The remaining abutment block 90 in Figure 11 is used for backing purposes. In any event, these several modes of operation are selectively employable to obtain the wanted ends. The blocks are engaged by actuating the air cylinders and the coiled springs serve to return the bolcks to their normal disengaged positions, as is obvious.

Air under pressure is delivered to the cylinder 102 by way of an air line 134 having therein an appropriate quick release valve 136. The other line 138 delivers air to the cylinder 124, also by way of a quick release valve 140. The latter valves assist in discharging the cylinders into the air when the cylinders are "off." The air to these lines is preferably obtained from the usual air brake system in the cab of the tractor 20. Therefore, and as shown at the left in Figure 8, the air brake control valve 142 is connected with the reservoir 144 and pump 146. The valve handle is denoted at 148 and serves to deliver air through the two-way valve 150 to the air brake line 152. The numerals 154 designate suitable couplings. The numeral 156 designates the extra valve which is installed to operate the lines 134 and 138. The valve handle 158 permits the lines to be selectively brought into play according to the will of the operator. In Figure 12, the same valve 156 is shown and the two figures together serve to show the manner of shifting the handle 158 to individually utilize the selected lines 134 and 138.

With this air line hookup, it is possible, obviously, for the driver in the cab to control the air cylinders 102 and 124 at will. It is obvious, however, that an individual air control (not shown) arrangement could, within the purview of the invention, be employed. As a matter of fact, suitable hand controls (not shown) could be provided within the vicinity of the fifth wheels means B for suitably operating the selectively usable abutment devices in relation to the stop pin 72.

By harnessing the forward half portion of the undercarriage to the semi-trailer by way of the stated parallel towing and steering tongues 42 and 44, and by utilizing the improved selective fifth wheel lock-up or control means for the undercarriage rearwardly of the fifth wheel means B, these collective means contribute their proportionate shares in producing over-all back-up controls, whereby the driver in the cab may utilize the undercarriage to best advantage in straight-away moves forwardly, properly on curves and turns, and may "lock up" and utilize the rear end of the undercarriage 26 for steering the latter and rear end of the semi-trailer with requisite nicety and certainty into limited parking spaces, especially for loading and unloading at a depot platform. The use of the restrictive slot 133 and shoulders 82 and 84 in Figure 9 of the drawings makes it possible to govern and regulate the angularity attitude of the rear end portion of the undercarriage to prevent its movement from stalling the undercarriage by throwing the tongues 42 and 44 out of effectively operable positions.

It will be evident that in backward travel motion of the disclosed tractor-trailer combination, the undercarriage 24 becomes, for the time being, the leading or steering vehicle and likewise the tractor 20, pushing backwardly through the two fifth wheel connections A and B respectively makes the factor of control more complex for the driver or operator; especially the act of steering the tractor 20.

Keeping the above in mind, it will be observed that Figs. 5 and 9 emphasize the need for the arcuate slot means 133 when both front and rear abutment blocks 90 and 112 are out of engagement. Therefore, the maximum angular extension and minimum turning radius required for example in the Anderson design, is permitted. Here, the flanges or abutments 82 and 84 cooperating with the stop pin insure that the undercarriage is not shocked when being propelled rearwardly on rough or uneven terrain.

The abutment block 112 in Figure 10 cooperating with the stop pin 72 results in reduced angular extension and turning radius which is more easily controlled by the tractor driver rearwardly in most instances by satisfactorily judging travel distances rearwardly. In this connection it is to be pointed out that either abutment block 90 or 112, may be caused to function with the tractor-trailer combination in motion, and released at a desired point in rearward travel motion.

Figure 11 shows the abutment block 90 cooperating with the stop pin 72 and this results in the minimum extension of the undercarriage to the right or left providing the special back-up control of the tractor-trailer combination in maintaining practical straight line travel rearwardly between two points, and directing the tractor-trailer into a narrow space after it is aligned for travel motion rearwardly. Secondly, for backing up the tractor-trailer at an intersection or maneuvering a turn of similar nature (90 degree arc travel) rearwardly, said block 90 can be actuated causing the arcuately shaped edge face to control the stop pin 72 until notch 92, is reached, as the tractor-trailer combination swings to alignment, said block 90 spontaneously embracing said stop pin 72 to effectively begin straight line travel motion rearwardly.

It will therefore be understood from the preceding description that when the locking and controlling blocks or abutments 90 and 112 are in the spaced apart positions shown in Figs. 5 and 9, respectively, and the stop pin 72 is then in precise alignment with the arcuate path or so-called arcuate slot means 133, the undercarriage is free to turn either left or right of said pin 72 the full length of the slot; whereby maximum angular extension and the minimum turning radius required, for example, by the Anderson undercarriage construction, is freely permitted. It will be understood, therefore, that with the lock-up means set as shown in these two Figures 5 and 9 the undercarriage would operate substantially as the undercarriage now does in the Anderson construction—now being manufactured and sold as the Hoobler Undercarriage. As soon, however, as the sliding abutments 90 and 112 are intentionally shifted and brought into play, the swivelling and turning degrees of the upper and lower fifth wheel disks 52 and 62 are progressively and further limited. That is, and as explained before, when the rear abutment block 112 has been shifted forwardly into engagement with the stop pin 72 as illustrated in Figure 10, respective shoulders 116 and 118 coacting with the relatively fixed stop pin 72 limit the turning arc to either left or right of the undercarriage. Stated otherwise, the space between said shoulders 116 and 118 restricts and limits the turning radius of the undercarriage as said shoulder comes into engagement with the relatively fixed stop pin 72. By the same token, when the front block or sliding abutment 90 is shifted rearwardly the two shoulders 94 and 96 then come into play and further limit the turning radius to the distance of said shoulders relative to said pin 72.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. In a special fifth wheel construction, in combination, a trailer having a platform, a disk hinged horizontally for swinging in a vertical plane on said platform, a wheel-supported undercarriage frame underlying said platform, a second disk corresponding to said first named disk, said second disk being fixedly mounted on said frame, a vertical kingpin concentrically connecting said disks in superposed contact, a horizontal adapter plate fixed to said first named disk, a vertical stop pin fixed to and depending from said plate rearwardly of and in longitudinal alignment with said kingpin, a second horizontal adapter plate fixed to said second named disk and spaced from and underlying said first named adapter plate in approximate parallelism, a pair of vertical guide flanges fixed on and rising from said second named plate, said flanges being in spaced parallelism and located one to the right and the other to the left of said fixed stop pin, said stop pin depending for limited operation in the space between said flanges, and a pair of abutment blocks slidable on said second named adapter plate between said flanges, the opposed forward and rearward edge portions of said blocks having keeper notches providing selectively employable pairs of shoulders, between which said stop pin may be situated for limiting the angular displacement between said disks and consequently limiting the turning radius of said undercarriage to the right or left of the longitudinal center line of said trailer platform.

2. The structure defined in claim 1 wherein said second named adapter plate has spaced parallel slots and said blocks are provided with shifting fingers depending through and slidably operable in said slots.

3. The structure of claim 2, and individually usable air cylinders mounted from said second named adapter plate, operating connections between the air cylinders and respective sets of shifting fingers, and contractible springs for returning and maintaining said blocks in positions fully disengaged from said stop pin.

4. The structure defined in claim 3, in combination with pressured air delivery lines communicatively connected with the respective air cylinders, and single remote-controlled valve means operatively connected with said lines, whereby said cylinders may be selectively operated from a remote position of control.

5. In a tractor-trailer combination, in combination, a tractor unit, a complemental trailer unit, first fifth wheel means swivelly connecting the forward end of said trailer unit to the trailing end of said tractor unit, a mobile undercarriage unit underlying said trailer unit, second fifth wheel means centrally and operatively connecting said undercarriage unit to the rear end portion of said trailer unit, said second fifth wheel means embodying a lower disk centered and fixed to said undercarriage, an upper disk likewise centered and hingedly attached to said trailer unit and concentrically superimposed on said lower disk and joined thereto by an axially centered kingpin situated in alignment with the longitudinal center line of said trailer unit, a dolly swivelly and slidably connected to the forward end of said undercarriage unit, tongue means pivotally and operatively connecting the leading steerable end of said dolly to an intermediate portion of said trailer unit, stop means fixedly carried by said said upper disk and spaced rearwardly from and disposed in longitudinal alignment with said kingpin, and selectively controllable and usable shoulder means mounted on and carried by said lower disk, said latter means embodying at least two spaced shoulders, one to the right and the other to the left of said relatively fixed stop means, whereby when one shoulder engages the stop means the turning radius of the undercarriage in a direction toward the right of the longitudinal center line is checked and limited by said stop means and when the other shoulder engages the stop means, the turning radius of the undercarriage to the left of said longitudinal center line is likewise checked and limited by said stop means, said shoulder means embodying a horizontal adapter plate fixed to the rear portion of said lower disk, said plate having a pair of transversely spaced rigid longitudinally extending guides, the latter serving as said shoulders, and a forwardly and rearwardly slidable abutment shiftably mounted on said adapter plate between said guides and forwardly situated between said stop means and periphery of said lower disk, said abutment having a pair of spaced shoulders closer together than said first named pair of shoulders and adapted to be moved into positions on diametrically opposite sides of said stop means to further limit the turning radius of said undercarriage in respect to the longitudinal center line of said trailer unit.

6. The structure defined in claim 5, and a second forwardly and rearwardly shiftable abutment slidably mounted on said adapter plate between said guides and situated rearwardly of said stop means and having a pair of optionally usable shoulders which are closer together than said first named shoulders and farther apart than said second named pair of shoulders.

7. In a tractor-trailer combination of the type including an automatically steered undercarriage, in combination, a tractor unit, a complemental trailer unit, first fifth wheel means swivelly connecting the forward end of said trailer unit to the trailing end of said tractor unit, an undercarriage unit underlying the rear end portion of said trailer unit, second fifth wheel means centrally and operatively connecting said undercarriage unit to the rear end portion of said trailer unit, said second fifth wheel means embodying a lower disk centered and fixed atop said undercarriage, an upper disk centered and hingedly attached to the underside of said trailer unit and concentrically superimposed on said lower disk and joined thereto by an axially centered kingpin situated in alignment with the longitudinal center line of said trailer unit, a wheeled dolly swivelly and slidably connected to the forward end of said carriage unit, tongue means pivotally and operatively connecting the leading steerable end of said dolly to an intermediate portion of said trailer unit, a stop pin fixed securely to the upper disk, spaced rearwardly from said kingpin and depending from said upper disk and disposed in longitudinal alignment with said kingpin, and readily engageable and releasable back-up control means for said second fifth wheel means, said back-up control means being normally maintained out of use and disengaged from said stop pin and embodying a forwardly and rearwardly movable abutment shiftably mounted on said lower disk and interposed between the kingpin and stop pin embodying one shoulder coplanar and engageable with said stop pin in a direction from left to right and a second shoulder also coplanar with and engageable with said stop pin in a direction from right to left, said shoulder being in close spaced parallelism so that when said stop pin is located between said shoulders after the shoulders have been moved to back-up control positions on opposite sides of the pin, said upper and lower disks are virtually locked one to the other with the result that said undercarriage unit becomes, when moved rearwardly, a steering vehicle for the rear end of said trailer unit, making it possible to regulate and arrest the swivelling arc of the undercarriage unit in a horizontal plane and to thus guide and direct the respective rear ends of the trailer unit and the undercarriage unit into a parking space of restricted area.

JOSEPH WEST HOPSON.

References Cited in the file of this patent
UNITED STATES PATENTS

| Number | Name | Date |
| --- | --- | --- |
| 2,126,819 | Schawlem | Aug. 16, 1938 |
| 2,146,145 | Huffman et al. | Feb. 7, 1939 |
| 2,330,897 | Kirksey | Oct. 5, 1943 |
| 2,400,738 | Brown | May 21, 1946 |
| 2,466,194 | Anderson et al. | Apr. 5, 1949 |